United States Patent [19]

Murakami et al.

[11] Patent Number: 5,063,192

[45] Date of Patent: Nov. 5, 1991

[54] CATALYST FOR PURIFICATION OF EXHAUST GASES

[75] Inventors: Hiroshi Murakami; Kazuko Yamagata, both of Hiroshima, Japan

[73] Assignee: Mazda Motor Corporation, Hiroshima, Japan

[21] Appl. No.: 549,143

[22] Filed: Jul. 6, 1990

[30] Foreign Application Priority Data

Jul. 6, 1989 [JP] Japan .................... 1-174817

[51] Int. Cl.$^5$ .............. B01J 21/04; B01J 21/06; B01J 23/02; B01J 23/10
[52] U.S. Cl. .................... 502/303; 502/304; 423/213.5
[58] Field of Search .............. 502/304, 303; 423/213.5

[56] References Cited

U.S. PATENT DOCUMENTS 4,680,282  7/1987  Blanchard et al. .......... 502/304
4,753,915  6/1988  Vogt et al. ............... 502/304
4,965,243  10/1990 Yamada et al. ............. 502/304

FOREIGN PATENT DOCUMENTS 63-104651  5/1988  Japan .................... 502/304

Primary Examiner—W. J. Shine
Attorney, Agent, or Firm—Fish & Richardson

[57] ABSTRACT

A catalyst for the purification of exhaust gases contains a catalyst carrier with a first coat layer formed on a surface of the catalyst carrier and with a second coat layer formed on a surface of the first coat layer. The first coat layer contains an active alumina and a catalyst component comprised of a noble metal such as platinum and rhodium and at least one of zirconium oxide, lanthanum oxide and barium oxide is immobilized on particles of the active alumina, and the second coat layer contains an active alumina, cerium oxide and a catalyst component comprised of another noble metal such as palladium. The oxides of zirconium, lanthanum and/or barium can prevent the alumina particles from aggregating together due to heat, thereby improving heat resistance of the catalyst.

9 Claims, 4 Drawing Sheets

CATALYST FOR PURIFICATION OF EXHAUST GASES

BACKGROUND OF THE INVENTION

1. Field of the Invention

The present invention relates to a catalyst for the purification of exhaust gases and, more particularly, to a heat-resistant catalyst for purifying exhaust gases.

2. Description of Related Art

Exhaust gases, such as NOx and CO, from vehicles, such automobiles, are removed, for example, by ternary catalysts which may be disposed in the exhaust system.

U.S. Pat. No. 4,888,320 discloses a catalyst composed of a catalyst carrier with two coats deposited thereon. Specifically, a first coat is deposited on a surface of the catalyst carrier and a second coat is further deposited on a surface of the first coat and, more specifically, the first coat is comprised of alumina and the second coat is comprised of alumina containing cerium oxide $CeO_2$, platinum Pt and rhodium Rh. As the alumina layer as the first coat is formed under the second coat, the second coat containing a catalyst constituent such as platinum can be made uniform in coat thickness, preventing the catalyst component from sintering.

Japanese Patent Unexamined Publication (kokai) No. 113,487/1975 discloses a catalyst for the purification of exhaust gases in which a platinum group metal is deposited on the coat layer formed on the catalyst carrier comprised of active alumina by preparing a slurry solution containing at least one of chromium and tungsten and at least one of calcium, strontium, barium, silicon, tin and zirconium and coating the slurry solution on the surface of the carrier.

Japanese Patent Unexamined Publication (kokai) No. 71,536/1987 discloses a catalyst consisting of a first coat layer comprised of alumina containing platinum and rhodium and a second coat layer, which is formed on the first coat layer, containing cerium oxide and palladium.

For conventional catalysts for purifying exhaust gases, active alumina used as the catalyst carrier has the tendency that it causes crystal growth as a result of an interaction of the active alumina with the platinum group metal due to heat of the exhaust gases in a reducing atmosphere, thereby resulting in stabilization and heat deterioration. Hence, such catalysts cannot stabilize its activity at low temperatures.

SUMMARY OF THE INVENTION

For recent automobiles, there is the increasing tendency that exhaust gases become higher in temperature due to high power of the engine and improvements in fuel or emission.

The present invention has been completed under the circumstances as described hereinabove and has the object to provide a catalyst for the purification of exhaust gases with improved thermal resistance, more particularly, a heat-resistant catalyst which can prevent heat deterioration of active alumina used as the catalyst carrier.

In order to achieve the object, the present invention consists of a catalyst for the purification of exhaust gases, comprising a catalyst carrier, a first coat layer and a second coat layer, with the first coat layer formed on a surface of the catalyst carrier and the second coat layer formed on a surface of the first coat layer; the first coat layer containing a catalyst component of a noble metal and active alumina with at least one of zirconium oxide, lanthanum oxide and barium oxide immobilized on particles of the active alumina; and the second coat layer containing a catalyst component of a noble metal, cerium oxide and alumina.

For the catalyst with the above structure, at least one of the oxides of zirconium, lanthanum and barium immobilized on active alumina particles can block the active alumina from integrating or aggregating with each other due to heat of exhaust gases, thereby preventing crystal growth of the active alumina and, as a result, preventing heat deterioration of the active alumina and improving heat resistance of the catalyst.

Other objects, features and advantages of the present invention will become apparent in the course of the description of the preferred embodiments, which follows, in conjunction with the accompanying drawings.

DETAILED DESCRIPTION OF THE PREFERRED EMBODIMENTS

The present invention will be described hereinafter more in detail.

Figure 1:
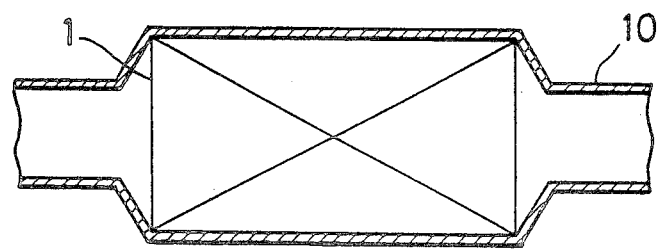
FIG. 1 is a diagrammatic representation in section showing a catalyst for the purification of exhaust gases according to an embodiment of the present invention.
Figure 2:
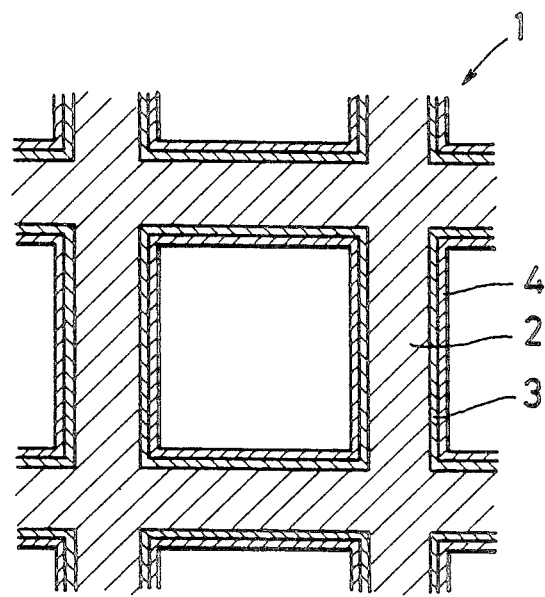
FIG. 2 is a partially enlarged sectional view showing the catalyst for the purification of exhaust gases according to an embodiment of the present invention.

As shown in FIG. 1, reference numeral 1 denotes a catalyst for purifying exhaust gases and the catalyst 1 is mounted to an exhaust tube 10 for discharging exhaust gases from a combustion engine of the automotive vehicle.

Figure 3:
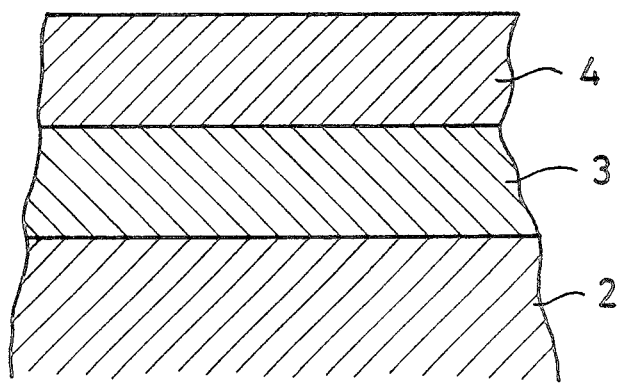
FIG. 3 is a diagrammatic representation of the catalyst according to an embodiment of the present invention.

As shown in FIG. 3, the catalyst 1 comprises a catalyst carrier 2 with a first coat layer 3 formed on a surface of the catalyst carrier 2 and a second coat layer 4 formed on a surface of the coat layer 3.

The catalyst carrier may be of a honeycomb structure and may be comprised of a ceramics such as cordierite, a heat-resistant metal or heat-resistant fibers.

The first coat layer 3 comprises active alumina as a major component, which contains a catalyst component comprised of a noble metal. On the active alumina, at least one of oxides such as zirconium oxide, lanthanum oxide and barium oxide is immobilized. The immobilization of the metal oxide can prevent particles of the active alumina from aggregating with each other. The catalyst component of the noble metal is dispersed in the active alumina and may include, for example, platinum and rhodium.

The second coat layer 4 may comprise cerium oxide and palladium that in turn is immobilized on the cerium oxide.

The catalyst 1 may be prepared in the following manner.

An appropriate amount of gamma-aluminium oxide ($Al_2O_3$) may be admixed with an equal amount of boehmite and a solution containing at least one of zirconium nitrate [$Zr(NO_3)_2$], lanthanum nitrate [$La(NO_3)_2$] and barium nitrate [$Ba(NO_3)_2$]. The resulting mixture is then dried to give a solid mass which in turn is pulverized with a ball mill to yield powders comprising the active alumina with at least one of zirconium, lanthanum and barium immobilized thereon. The powders may have an average particle size of 100 Angstroms or smaller, preferably ranging from 50 to 100 Angstroms.

The powders may then be admixed with water and nitric acid, thereby yielding a slurry, and a catalyst carrier 2 having a honeycomb structure may be immersed in the slurry. The catalyst carrier 2 may then be taken from the slurry and a surplus of the slurry on the surface of the catalyst carrier 2 may be removed by air blowing, thereby giving the catalyst carrier 2 with the slurry coated to the surface thereof as a wash coat. The carrier 2 with the slurry may be dried at elevated temperature for an appropriate period of time and then calcined for an appropriate time period at a temperature higher than the temperature at which the carrier 2 with the slurry has been dried, thereby providing the catalyst carrier 2 with the first coat layer 3 deposited on the surface thereof.

The catalyst carrier 2 with the first coat layer 3 may then be impregnated with a solution containing a noble metal compound, thereby depositing the noble metal on the first coat layer 3 as a catalyst component. As the noble metal compound may be appropriately selected a platinum compound and a rhodium compound. As the platinum compound, there may be employed any one that can exhibit the activity of purifying exhaust gases when deposited on the catalyst carrier and may include, for example, $Pt(NO_2)_2(NH_3)_2$, platinum chloride, and so on. The rhodium compound may include, for example, rhodium nitrate and so on, although any rhodium compound may be used for this purpose as long as it can demonstrate the function of removing hazardous components from exhaust gases when deposited on the catalyst carrier. The catalyst carrier 2 with its first coat layer 3 may be dried for an appropriate period of time at elevated temperature and then calcined for an appropriate time period at a temperature higher than the temperature at which the catalyst carrier 2 with the first coat layer 3 has been dried, thereby depositing the noble metal on the first coat layer 3 as the catalyst component. The amount of the alumina in the first coat layer 3 may appropriately range from 2% to 10% by weight with respect to the weight of the catalyst carrier 2 and the amount of the noble metal to be deposited on the first coat layer be above approximately 1.0 grams per liter.

Separately from the catalyst carrier 2 with the first coat layer 3 as the wash coat, powders may be prepared from cerium oxide ($CeO_2$) by admixing appropriate amounts of cerium oxide and boehmite with a solution of another noble metal compound, drying the resulting mixture and pulverizing the dried mixture into finely divided particles having an average particle size of 30 Angstroms or larger, preferably ranging from 30 to 100 Angstroms. The noble metal compound to be used for this purpose may include, for example, a palladium compound such as palladium chloride.

The resulting powders may then be admixed with water, resulting in a slurry in which the catalyst carrier 2 with the first coat layer 3 may in turn be immersed to thereby form a second coat layer 4 on the surface of the first coat layer 3. After a surplus of the slurry on the surface of the first coat layer 3 has been removed by means of air blowing, the carrier 2 may be dried for an appropriate period of time at elevated temperature and then calcined for an appropriate period of time at a temperature higher than the temperature at which the carrier 2 has been dried, thereby yielding the carrier 2 with the second coat layer 4 formed on the surface of the first coat layer 3. The amount of the second coat layer may vary with respect to the weight of the catalyst carrier 2 and the amount of palladium deposited may be above 0.5 gram per liter.

For the catalyst 1 as prepared hereinabove, at least one of zirconium oxide, lanthanum oxide and barium oxide is immobilized on particles of the active alumina in the first coat layer 3, functioning as suppressing the particles of the active alumina from aggregating and blocking the crystal growth of the active alumina upon exposure to high-temperature heat of exhaust gases. This structure can also prevent and suppress heat deterioration of the active alumina in the first coat layer 3 and thereby improving heat resistance of the catalyst 1 as well as stabilizing the catalyst activity at low temperatures.

Further, as the catalyst 1 according to the present invention has the first coat layer 3 deposited with the noble metal compound such as platinum and rhodium and further has the second coat layer 4 deposited with the another noble metal compound such as palladium compound. Thus, as the platinum is deposited in the coat layer different from the other coat layer in which the palladium is deposited, the former may not be brought into contact with the latter, thereby preventing the former from alloying with the latter upon exposure to heat of high temperature. As a result, the catalyst 1 according to the present invention can prevent heat deterioration.

As is apparent from the foregoing description, the rhodium may be deposited in the first coat layer 3 together with the platinum and, in this case, the former may be interposed between the latter. This structure can serve as preventing the platinum from sintering with each other and, as a result, as suppressing heat deterioration of the platinum. This can naturally help the catalyst 1 suppress its heat deterioration.

Furthermore, as the catalyst 1 is provided with the second coat layer 4 containing cerium oxide, the palladium deposited therein can serve as improving its activity of purifying exhaust gases by removing their hazardous components such as hydrocarbons and carbon monoxide, in association with the activity of the cerium oxide for storing oxygen therein.

The ratio of the weight of the cerium oxide contained in the second coat layer 4 to that of the aluminium oxide contained therein may range from approximately 95 to 5 to approximately 70 to 30. If the amount of the cerium oxide would exceed its upper limit, it may become likely to come off from the first coat layer 3 on which the second coat layer 4 is coated and consequently cause durability of the resulting catalyst 1 to be impaired, although the catalyst activity may be improved. On the other hand, if the amount of the cerium oxide would become too small, the activity of the catalyst 1 for purifying exhaust gases may be lessened.

The catalyst 1 according to the present invention will now be described hereinafter by way of working examples with reference to comparative examples.

EXAMPLE 1

100 grams of gamma-aluminium oxide ($Al_2O_3$) was admixed with 100 grams of boehmite and a solution containing 1% by weight of zirconium nitrate [$Zr(NO_3)_2$], a solution of 1% by weight of lanthanum nitrate [$La(NO_3)_2$] and a solution of 1% by weight of barium nitrate [$Ba(NO_3)_2$]. The resulting mixture was then dried to give a solid mass which in turn was pulverized with a ball mill to yield powders comprising the active alumina with zirconium, lanthanum and barium immobilized thereon and having an average particle size of 100 Angstroms. The powders was then admixed with 240 ml of water and 1.0 cc of nitric acid, thereby yielding a slurry, and a catalyst carrier 2 having a honeycomb structure was immersed in the slurry. The catalyst carrier 2 may then be taken from the slurry and a surplus of the slurry on the surface of the catalyst carrier 2 may be removed by air blowing. The carrier 2 with the slurry was dried at 130° C. for 1 hour and then calcined at 550° C. for 1.5 hours.

The catalyst carrier 2 with the first coat layer 3 was then impregnated with a solution containing a platinum compound as represented by formula: $Pt(NO_2)_2(NH_3)_2$, and rhodium nitrate. The catalyst carrier 2 with its first coat layer 3 was dried at 200° C. for 1 hour and then calcined at 600° C. for 2 hours to thereby form the first coat layer 3. The amount of the noble metals deposited was 1.6 grams per liter.

Separately from the catalyst carrier 2 with the first coat layer 3, powders were prepared from cerium oxide ($CeO_2$) by admixing 120 grams of cerium oxide and 50 grams of boehmite with a solution of palladium chloride, drying the resulting mixture and pulverizing the dried mixture into finely divided particles having an average particle size of 30 Angstroms.

The resulting powders were then admixed with 240 ml of water, resulting in a slurry in which the catalyst carrier 2 with the first coat layer 3 was in turn immersed to thereby form a second coat layer 4 on the surface of the first coat layer 3. After a surplus of the slurry on the surface of the first coat layer 3 has been removed by means of air blowing, the carrier 2 was dried at 130° C. for 1 hour and then calcined at 550° C. for 1.5 hours. The amount of palladium deposited was 1.0 grams per liter.

The amount of the cerium oxide was found to be 14% by weight with respect to the weight of the alumina.

The catalyst 1 so prepared was tested for its activity of removing hydrocarbons from exhaust gases with an air/fuel ratio of 14.7 at the temperature of 400° C. The result is shown by line A in FIG. 5.

EXAMPLE 2

The catalyst was prepared in substantially the same manner as in Example 1 except for the use of a solution containing 5% by weight of zirconium oxide. The result of removal of hydrocarbons for this catalyst is shown by line A in FIG. 5.

EXAMPLE 3

The catalyst was prepared in substantially the same manner as in Example 1 except for the use of a solution containing 10% by weight of zirconium oxide. The result of removal of hydrocarbons for this catalyst is shown by line A in FIG. 5.

EXAMPLE 4

The catalyst was prepared in substantially the same manner as in Example 1 except for the use of a solution containing 1% by weight of zirconium oxide, a solution containing 5% by weight of lanthanum oxide and a solution containing 5% by weight of barium oxide. The result of removal of hydrocarbons for this catalyst is shown by line B in FIG. 5.

EXAMPLE 5

The catalyst was prepared in substantially the same manner as in Example 4 except for the use of a solution containing 5% by weight of zirconium oxide. The result of removal of hydrocarbons for this catalyst is shown by line B in FIG. 5.

EXAMPLE 6

The catalyst was prepared in substantially the same manner as in Example 4 except for the use of a solution containing 10% by weight of zirconium oxide. The result of removal of hydrocarbons for this catalyst is shown by line B in FIG. 5.

EXAMPLE 7

The catalyst was prepared in substantially the same manner as in Example 1 except for the use of a solution containing 1% by weight of zirconium oxide, a solution containing 10% by weight of lanthanum oxide and a solution containing 10% by weight of barium oxide. The result of removal of hydrocarbons for this catalyst is shown by line C in FIG. 5.

EXAMPLE 8

The catalyst was prepared in substantially the same manner as in Example 7 except for the use of a solution containing 5% by weight of zirconium oxide. The result of removal of hydrocarbons for this catalyst is shown by line C in FIG. 5.

EXAMPLE 9

The catalyst was prepared in substantially the same manner as in Example 7 except for the use of a solution containing 10% by weight of zirconium oxide. The result of removal of hydrocarbons for this catalyst is shown by line C in FIG. 5.

COMPARATIVE EXAMPLE 1

To a slurry of a mixture of 100 grams of gamma-aluminium oxide and 100 grams of boehmite in 240 ml of water and 1 ml of nitric acid were added a zirconium nitrate solution, a lanthanum nitrate solution and a barium nitrate solution so as to allow a total weight of the wash coat to account for 21% by weight with respect to the weight of the catalyst carrier in a honeycomb structure. In this slurry was immersed the catalyst carrier, and the carrier was taken from the slurry followed by removing a surplus of the slurry by means of air blowing. Then the carrier was dried at 130° C. for 1 hour and calcined at 550° C. for 1.5 hours. Thereafter, the carrier was immersed in a solution containing the same amounts of platinum, rhodium and palladium as in Example 5. The immersed carrier was then dried at 200° C. for 1 hour and calcined at 600° C. for 2 hours, thereby yielding the catalyst containing each 5% by weight of zirconium oxide, lanthanum oxide and barium oxide.

COMPARATIVE EXAMPLE 2

To a slurry of a mixture of 100 grams of gamma-aluminium oxide and 100 grams of boehmite in 240 ml of water and 1 ml of nitric acid were added a zirconium nitrate solution, a lanthanum nitrate solution and a barium nitrate solution so as to allow a total weight of the wash coat to account for 21% by weight with respect to the weight of the catalyst carrier in a honeycomb structure. In this slurry was immersed the catalyst carrier, and the carrier was taken from the slurry followed by removing a surplus of the slurry by means of air blowing. Then the carrier was dried at 130° C. for 1 hour and calcined at 550° C. for 1.5 hours.

Thereafter, the resulting carrier was immersed in a solution of platinum chloride and rhodium chloride and it was then dried at 200° C. for 1 hour followed by calcining it at 600° C. for 2 hours, thereby forming the first coat layer. The alumina amount in the first coat layer was found to be 7% by weight based on the weight of the carrier, and the amount of the noble metals deposited was found to be 1.6 grams per liter (a Pt:Rh ratio being 5:1).

Separately, a mixture of 120 grams of cerium oxide and 50 grams of boehmite with a solution of palladium chloride was dried and the resulting solid mass was pulverized into powders which in turn were admixed with 240 ml of water to provide a slurry. In this slurry was immersed the first coat layer of the above-prepared carrier, and the carrier was removed from the slurry followed by removing a surplus of the slurry remaining on the surface thereof by means of air blowing. The resulting carrier was dried at 130° C. for 1 hour and then calcined at 550° C. for 1.5 hours, thereby forming the second coat layer on the first coat layer. The amount of the alumina in the second coat layer was found to be 14% by weight based on the weight of the carrier, and the palladium deposited thereon was 1.0 gram per liter.

The catalyst obtained in Example 5 and the catalysts obtained in Comparative Examples 1 and 2 were tested for ability of removing hydrocarbons from exhaust gases. In this tests, each of the catalysts was filled in the amount of 24 ml and aged for 50 hours at the air temperature of 900° C. The exhaust gases used for the test were passed through the catalyst at a space velocity of 60,000 hour$^{-1}$ under the air/fuel ratio of 14.7. The HC purification ratios were measured by varying the temperature of the exhaust gases at the inlet portion of the catalyst. The test results are shown in FIG. 4.

Figure 4:
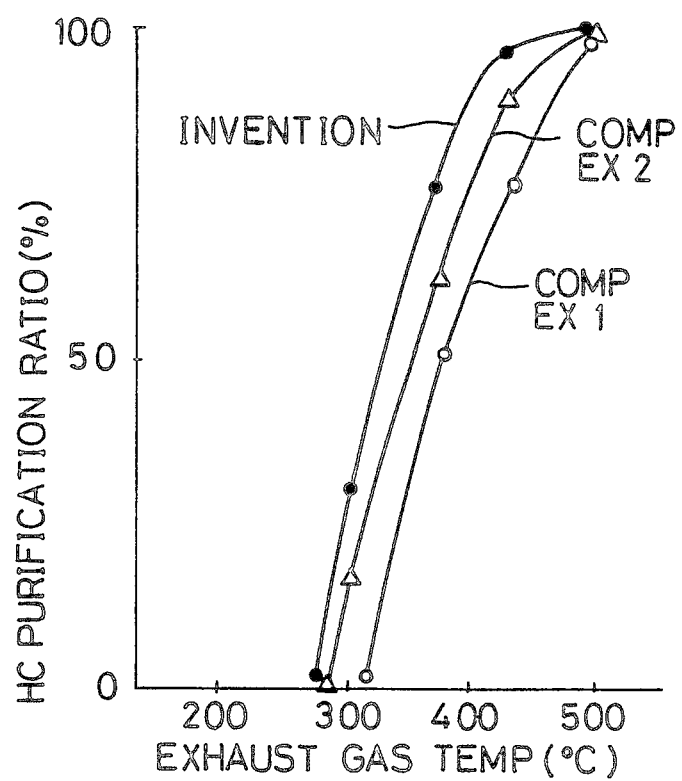
FIG. 4 is a graph showing the characteristic concerning the relationship of HC purification ratio with the temperature of exhaust gases at the inlet of the catalyst.

As is apparent from the test results as shown in FIG. 4, it is found that the catalyst according to the present invention has shown its catalytic activity of purifying the exhaust gases at temperatures lower than the temperatures at which the catalysts according to the comparative examples have shown, thereby suppressing heat deterioration and improving heat resistance.

COMPARATIVE EXAMPLE 3

The catalyst was prepared in substantially the same manner as in Example 1 except for the use of a solution containing 12% by weight of zirconium oxide. The result of removal of hydrocarbons for this catalyst is shown by line A in FIG. 5.

COMPARATIVE EXAMPLE 4

The catalyst was prepared in substantially the same manner as in Example 4 except for the use of a solution containing 12% by weight of zirconium oxide. The result of removal of hydrocarbons for this catalyst is shown by line B in FIG. 5.

COMPARATIVE EXAMPLE 5

The catalyst was prepared in substantially the same manner as in Example 7 except for the use of a solution containing 12% by weight of zirconium oxide. The result of removal of hydrocarbons for this catalyst is shown by line C in FIG. 5.

EXAMPLE 10

The catalyst was prepared in substantially the same manner as in Example 1 except for the use of a solution containing 1% by weight of zirconium oxide and 1% by weight of lanthanum oxide without using the solution containing barium oxide. The result of removal of hydrocarbons for this catalyst is shown by line D in FIG. 6.

EXAMPLE 11

The catalyst was prepared in substantially the same manner as in Example 10 except for the use of a solution containing 5% by weight of lanthanum oxide. The result of removal of hydrocarbons for this catalyst is shown by line D in FIG. 6.

EXAMPLE 12

The catalyst was prepared in substantially the same manner as in Example 10 except for the use of a solution containing 10% by weight of lanthanum oxide. The result of removal of hydrocarbons for this catalyst is shown by line D in FIG. 6.

EXAMPLE 13

The catalyst was prepared in substantially the same manner as in Example 10 except for the use of a solution containing 5% by weight of zirconium oxide and 1% by weight of lanthanum oxide without using the solution containing barium oxide. The result of removal of hydrocarbons for this catalyst is shown by line E in FIG. 6.

EXAMPLE 14

The catalyst was prepared in substantially the same manner as in Example 13 except for the use of a solution containing 5% by weight of lanthanum oxide. The result of removal of hydrocarbons for this catalyst is shown by line E in FIG. 6.

EXAMPLE 15

The catalyst was prepared in substantially the same manner as in Example 13 except for the use of a solution containing 10% by weight of lanthanum oxide. The result of removal of hydrocarbons for this catalyst is shown by line E in FIG. 6.

EXAMPLE 16

The catalyst was prepared in substantially the same manner as in Example 10 except for the use of a solution containing 10% by weight of zirconium oxide and 1% by weight of lanthanum oxide without using the solution containing barium oxide. The result of removal of hydrocarbons for this catalyst is shown by line F in FIG. 6.

EXAMPLE 17

The catalyst was prepared in substantially the same manner as in Example 16 except for the use of a solution containing 5% by weight of lanthanum oxide. The result of removal of hydrocarbons for this catalyst is shown by line F in FIG. 6.

EXAMPLE 18

The catalyst was prepared in substantially the same manner as in Example 16 except for the use of a solution containing 10% by weight of lanthanum oxide. The result of removal of hydrocarbons for this catalyst is shown by line F in FIG. 6.

COMPARATIVE EXAMPLE 6

The catalyst was prepared in substantially the same manner as in Example 10 except for the use of a solution containing 12% by weight of lanthanum oxide. The result of removal of hydrocarbons for this catalyst is shown by line D in FIG. 6.

COMPARATIVE EXAMPLE 7

The catalyst was prepared in substantially the same manner as in Example 13 except for the use of a solution containing 12% by weight of lanthanum oxide. The result of removal of hydrocarbons for this catalyst is shown by line E in FIG. 6.

COMPARATIVE EXAMPLE 8

The catalyst was prepared in substantially the same manner as in Example 16 except for the use of a solution containing 12% by weight of lanthanum oxide. The result of removal of hydrocarbons for this catalyst is shown by line F in FIG. 6.

EXAMPLE 19

The catalyst was prepared in substantially the same manner as in Example 1 except for the use of a solution containing 1% by weight of zirconium oxide and 1% by weight of barium oxide without using the solution containing lanthanum oxide. The result of removal of hydrocarbons for this catalyst is shown by line G in FIG. 7.

EXAMPLE 20

The catalyst was prepared in substantially the same manner as in Example 19 except for the use of a solution containing 5% by weight of barium oxide. The result of removal of hydrocarbons for this catalyst is shown by line G in FIG. 7.

EXAMPLE 21

The catalyst was prepared in substantially the same manner as in Example 19 except for the use of a solution containing 10% by weight of barium oxide. The result of removal of hydrocarbons for this catalyst is shown by line G in FIG. 7.

EXAMPLE 22

The catalyst was prepared in substantially the same manner as in Example 1 except for the use of a solution containing 5% by weight of zirconium oxide and 1% by weight of barium oxide without using the solution containing lanthanum oxide. The result of removal of hydrocarbons for this catalyst is shown by line H in FIG. 7.

EXAMPLE 23

The catalyst was prepared in substantially the same manner as in Example 22 except for the use of a solution containing 5% by weight of barium oxide. The result of removal of hydrocarbons for this catalyst is shown by line H in FIG. 7.

EXAMPLE 24

The catalyst was prepared in substantially the same manner as in Example 22 except for the use of a solution containing 10% by weight of barium oxide. The result of removal of hydrocarbons for this catalyst is shown by line H in FIG. 7.

EXAMPLE 25

The catalyst was prepared in substantially the same manner as in Example 1 except for the use of a solution containing 10% by weight of zirconium oxide and 1% by weight of barium oxide without using the solution containing lanthanum oxide. The result of removal of hydrocarbons for this catalyst is shown by line I in FIG. 7.

EXAMPLE 26

The catalyst was prepared in substantially the same manner as in Example 25 except for the use of a solution containing 5% by weight of barium oxide. The result of removal of hydrocarbons for this catalyst is shown by line I in FIG. 7.

EXAMPLE 27

The catalyst was prepared in substantially the same manner as in Example 22 except for the use of a solution containing 10% by weight of barium oxide. The result of removal of hydrocarbons for this catalyst is shown by line I in FIG. 7.

COMPARATIVE EXAMPLE 9

The catalyst was prepared in substantially the same manner as in Example 19 except for the use of a solution containing 12% by weight of barium oxide. The result of removal of hydrocarbons for this catalyst is shown by line G in FIG. 7.

COMPARATIVE EXAMPLE 10

The catalyst was prepared in substantially the same manner as in Example 22 except for the use of a solution containing 12% by weight of barium oxide. The result of removal of hydrocarbons for this catalyst is shown by line H in FIG. 7.

COMPARATIVE EXAMPLE 11

The catalyst was prepared in substantially the same manner as in Example 25 except for the use of a solution containing 12% by weight of barium oxide. The result of removal of hydrocarbons for this catalyst is shown by line I in FIG. 7.

EXAMPLE 28

The catalyst was prepared in substantially the same manner as in Example 1 except for the use of a solution containing cerium oxide in the amount varying from 5% to 30% by weight (5%, 10%, 20% and 30% by weight). The result of removal of hydrocarbons for this catalyst is shown by line J in FIG. 8.

EXAMPLE 29

The catalyst was prepared in substantially the same manner as in Example 28 except for the use of a solution containing 5% by weight of zirconium oxide, lanthanum oxide and barium oxide and cerium oxide. The result of removal of hydrocarbons for this catalyst is shown by line K in FIG. 8.

EXAMPLE 30

The catalyst was prepared in substantially the same manner as in Example 28 except for the use of a solution containing 10% by weight of zirconium oxide, lanthanum oxide and barium oxide and cerium oxide. The result of removal of hydrocarbons for this catalyst is shown by line L in FIG. 8.

COMPARATIVE EXAMPLE 12

The catalyst was prepared in substantially the same manner as in Example 28 except for the use of a solution containing 1% by weight of cerium oxide. The result of removal of hydrocarbons for this catalyst is shown by line J in FIG. 8.

COMPARATIVE EXAMPLE 13

The catalyst was prepared in substantially the same manner as in Example 29 except for the use of a solution containing 1% by weight of cerium oxide. The result of removal of hydrocarbons for this catalyst is shown by line K in FIG. 8.

COMPARATIVE EXAMPLE 14

The catalyst was prepared in substantially the same manner as in Example 30 except for the use of a solution containing 1% by weight of cerium oxide. The result of removal of hydrocarbons for this catalyst is shown by line L in FIG. 8.

Figure 5:
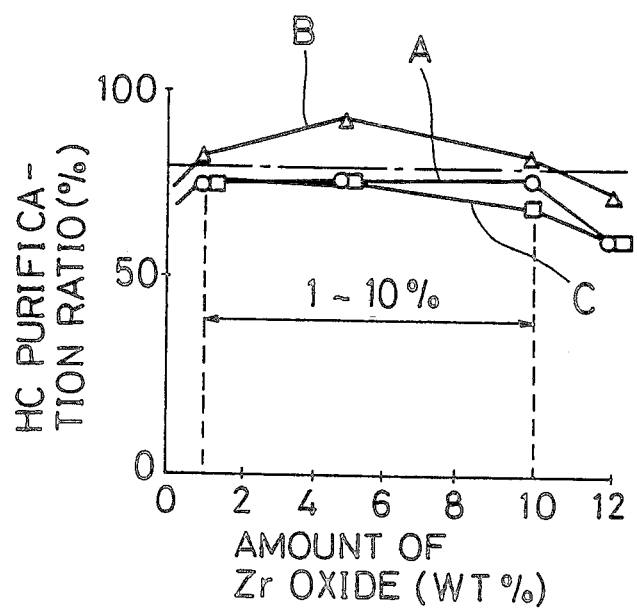
FIG. 5 is a graph showing the characteristic concerning the relationship of HC purification ratio with the amount of zirconium oxide.

From the results shown in FIG. 5, it was found that the activity of removing hydrocarbons (HC) from exhaust gases was reduced when the amount of zirconium oxide is below 1% by weight or above 10% by weight in each case as shown in comparative examples 3 to 5. Although the reason for such a reduction in the HC purification ratio is not clear, it may be considered that a too much amount of zirconium oxide would suppress the catalytic functions of the other catalyst components. It is thus preferred that the amount of zirconium oxide may range from 1% to 10% by weight with respect to the weight of the wash coat of the first and second coat layers.

Figure 6:
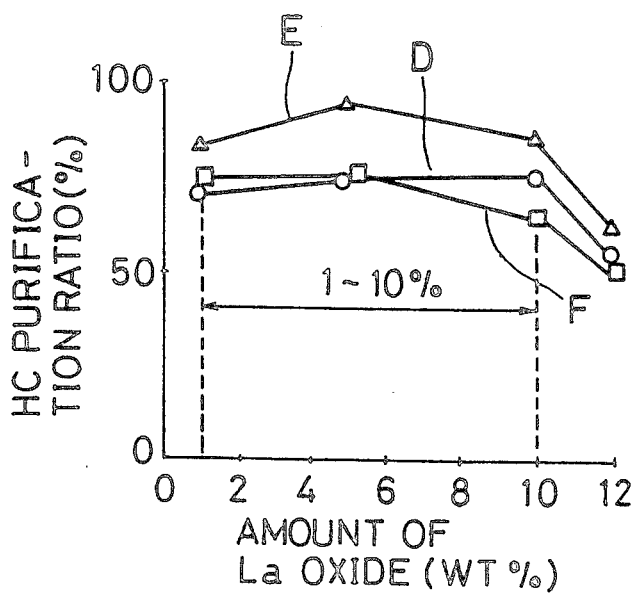
FIG. 6 is a graph showing the characteristic concerning the relationship of HC purification ratio with the amount of lanthanum oxide.

Further, from the results shown in FIG. 6, it was found, too, that the catalytic activity of the catalysts may be reduced when the catalysts as shown in Comparative Examples 6 to 8 contain less than 1% by weight or above 10% by weight of lanthanum oxide. It is thus preferred that the lanthanum oxide is contained in the amount ranging from 1% to 10% by weight based on the weight of the wash coat of the first and second coat layers.

Figure 7:
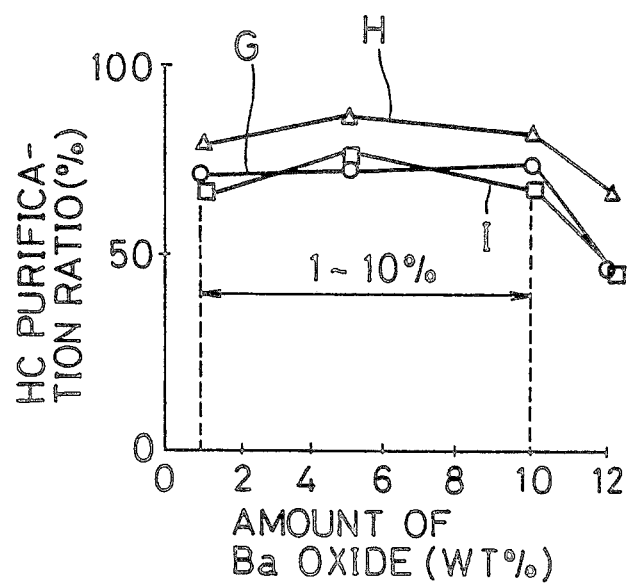
FIG. 7 is a graph showing the characteristic concerning the relationship of HC purification ratio with the amount of barium oxide.

As shown in FIG. 7, it is preferred to use the barium oxide in the amount ranging from 1% to 10% by weight based on the weight of the wash coat of the first and second coat layers for the same reasons as described hereinabove.

Figure 8:
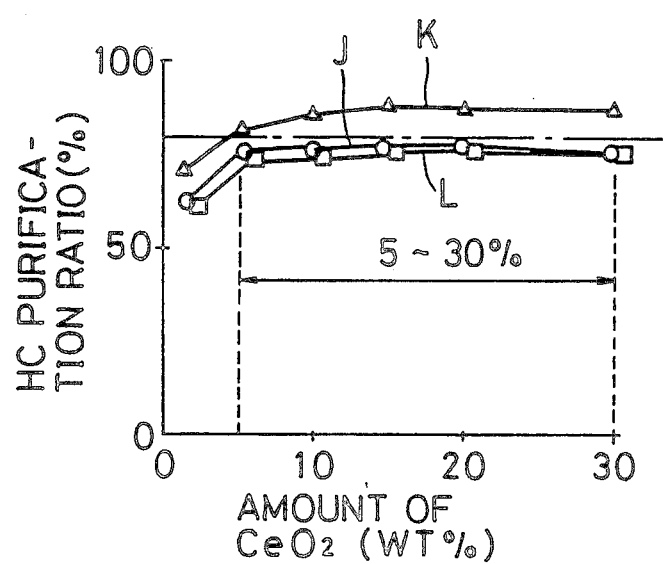
FIG. 8 is a graph showing the characteristic concerning the relationship of HC purification ratio with the amount of cerium oxide.

FIG. 8 shows the instances where the catalytic activity is reduced when the amount of cerium oxide is less than 5% by weight or above 30% by weight. Hence, it is preferred that the amount of the cerium oxide range from 5% to 30% by weight on the basis of the weight of the carrier 2 and the first coat layer 3.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the present invention.

What is claimed is:

1. A catalyst for the purification of exhaust gases consisting essentially of a catalyst carrier with a first coat layer formed on a surface of the catalyst carrier and with a second coat layer formed on a surface of the first coat layer;

wherein the first coat layer consists essentially of an active alumina and a catalyst component comprised of a noble metal and at least one of zirconium oxide, lanthanum oxide and barium oxide is immobilized on particles of the active alumina;

the second coat layer consists essentially of an active alumina, cerium oxide and a catalyst component comprised of another noble metal, wherein a ratio of the weight of the active alumina to cerium oxide ranges from approximately 95 to 5 to approximately 70 to 30; and wherein said zirconium oxide, lanthanum oxide or barium oxide is contained in an amount ranging from 1% to 10% by weight based on the weight of a total wash coat of the first coat layer and the second coat layer.

2. A catalyst as claimed in claim 1, wherein the noble metal contained in the first coat layer is platinum and/or rhodium.

3. A catalyst as claimed in claim 1, wherein said another noble metal contained in the second coat layer is palladium.

4. A catalyst as claimed in claim 1, wherein said noble metal contained in the first coat layer is platinum and rhodium and the another noble metal contained in the second coat layer is palladium.

5. A catalyst as claimed in claim 3, wherein cerium oxide contained in the second coat layer is contained in the amount ranging from 5% to 30% by weight based on the weight of the catalyst carrier and the first coat layer.

6. A catalyst as claimed in claim 1, wherein zirconium oxide, lanthanum oxide and barium oxide are immobilized on the particles of the active alumina.

7. A catalyst as claimed in claim 1, wherein zirconium oxide and lanthanum oxide are immobilized on the particles of the active alumina.

8. A catalyst as claimed in claim 1, wherein zirconium oxide and barium oxide are immobilized on the particles of the active alumina.

9. A catalyst as claimed in claim 4, wherein zirconium oxide, lanthanum oxide and barium oxide are immobilized on the particles of the active alumina.

* * * * *